(No Model.)

J. V. RENCHARD.

LUBRICATOR.

No. 275,707.

Patented Apr. 10, 1883.

3 Sheets—Sheet 2.

WITNESSES,

E. E. Renchard.
A. M. Graham.

INVENTOR,

J. Vincent Renchard.

(No Model.)   3 Sheets—Sheet 3.

J. V. RENCHARD.
LUBRICATOR.

No. 275,707.   Patented Apr. 10, 1883.

WITNESSES,
E. E. Renchard
A. M. Graham.

INVENTOR,
J. Vincent Renchard.

UNITED STATES PATENT OFFICE.

J. VINCENT RENCHARD, OF WINDSOR, ONTARIO, CANADA.

LUBRICATOR.

SPECIFICATION forming part of Letters Patent No. 275,707, dated April 10, 1883.

Application filed December 19, 1882. (No model.)

*To all whom it may concern:*

Be it known that I, J. VINCENT RENCHARD, a citizen of the United States, residing at Windsor, Province of Ontario, Canada, have invented an Improved Lubricator, of which the following is a specification.

In designing this lubricator it has been my object to produce a compendium of every desirable feature which time and experience could contribute. They are embraced in the following details, namely: arrangement of channels, valves, and their relative proportions best adapted to properly infuse the steam used in the engine with lubricants; construction of details with reference to equal wear of the whole device; contour or outline formed of graceful arcs, enabling ease of cleaning and application to parts, forming an elegant as well as a valuable attachment or adjunct to the steam-engine; its construction in such a manner as to prevent the derangement of its alignment by dismemberment; the ease and low cost with which it can be produced, and the consequent low cost to the public, yet embracing every feature of value essential to its requirements, embracing new and original features without involving complexity, all as hereinafter fully described, and pointed out in the claims.

Figure 1:
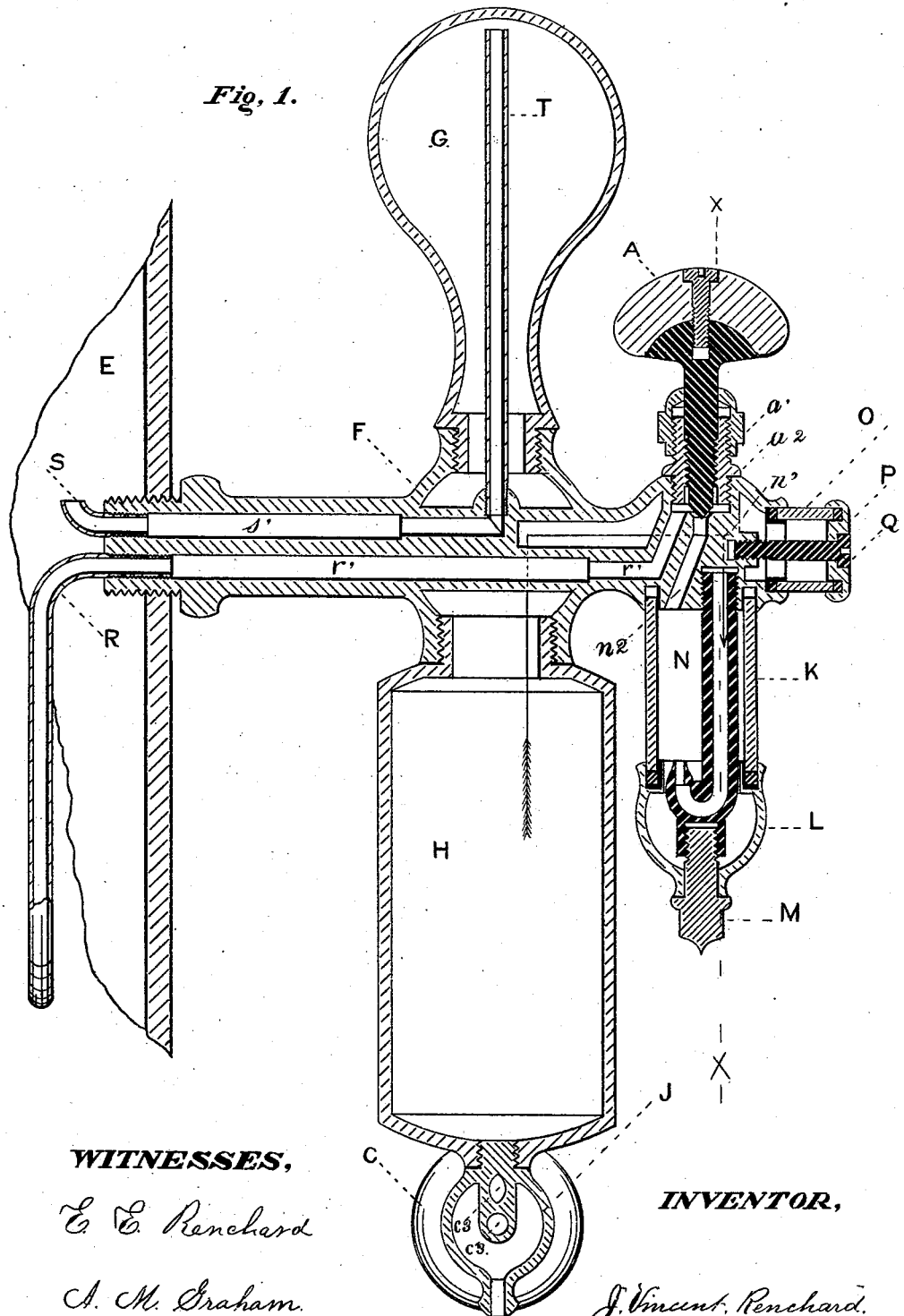
Figure 2:
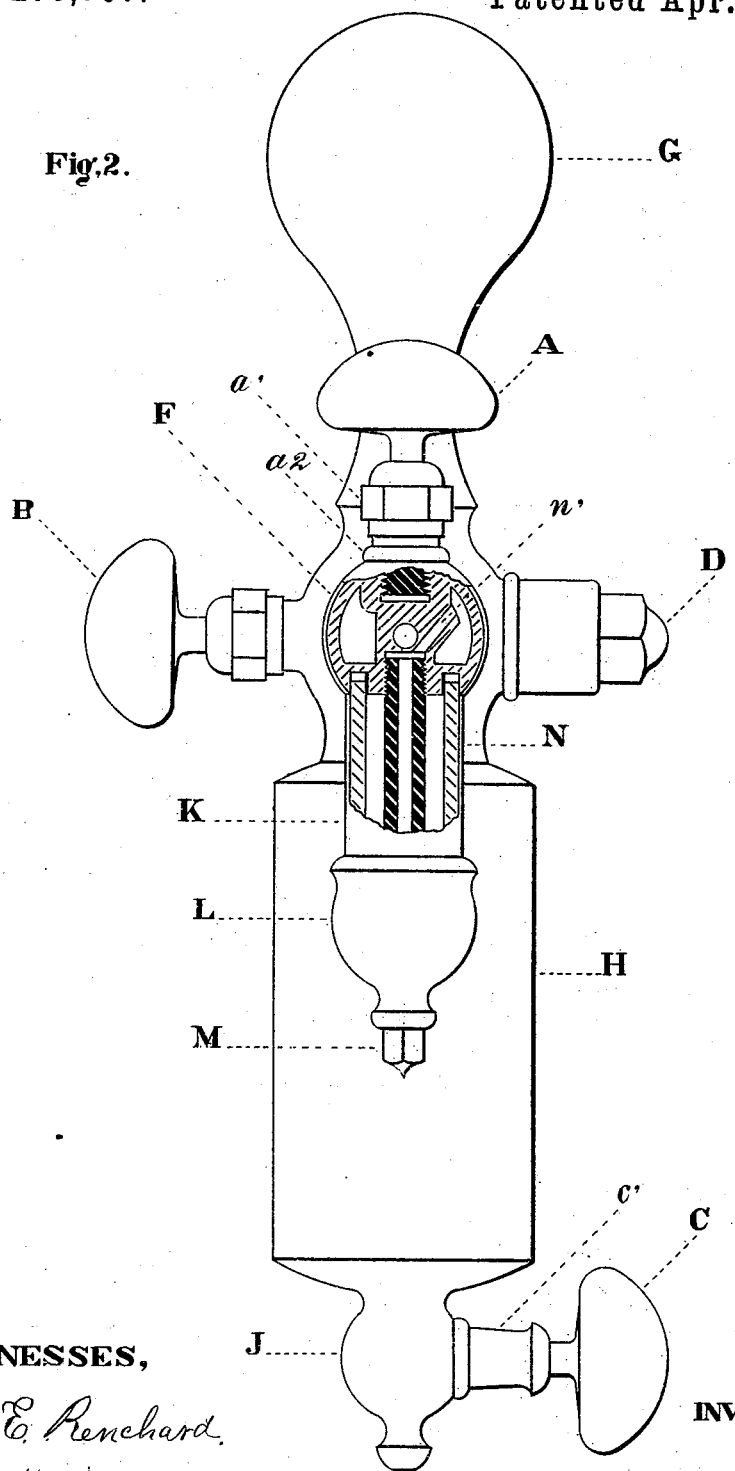
Figure 3:
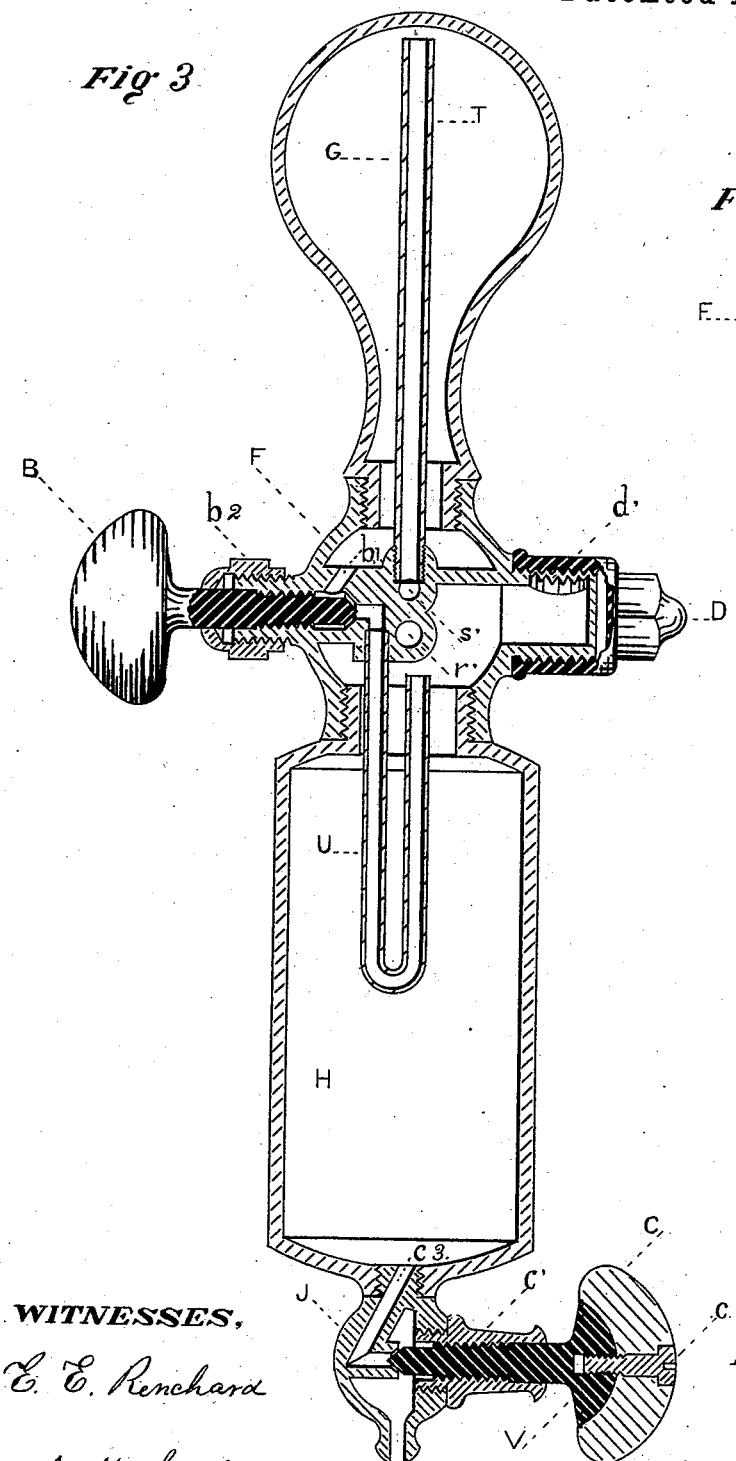
Figure 4:
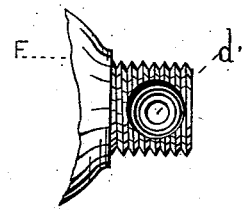

In the accompanying drawings, Figure 1 is a side central section of my device. Fig. 2 is a front elevation of my lubricator, having its extreme front central extension removed to show a front section through the line $xx$, Fig. 1, and more particularly to show the passage $n'$, through which the oil passes to enter conductor N, hereinafter more fully explained. Fig. 3 is a front central section, showing one or two details in elevation. Fig. 4 is a plan of a portion of the trunk F, and intended to show a feature marked, $d'$.

Technical terms of parts indicated by reference-letters in all the views are: E, steam-pipe between boiler and engine, Fig. 1; F, connecting-trunk of lubricator, Fig. 1; G, condenser, Fig. 1; H, oil-magazine, Fig. 1; S, steam-inlet, $s'$ steam-channel, Fig. 1; T, steam-conductor, Fig. 1; $b'$, water-inlet channel, Fig. 3; U, water-discharge tube, Fig. 3; B, water-valve, Fig. 3; $b^2$, pack-nut, Fig. 3; $n'$, oil-descent channel, Fig. 2; A, oil-valve, Figs. 1 and 2; N, oil-conductor, Figs. 1 and 2; K, glass visible feed-indicator, Fig. 1; L, indicator-vase, Fig. 1; M, vase-bolt, Fig. 1; $n^2$, oil-ascent channel, Fig. 1; $a^2$, valve-socket, Fig. 1; $a'$, pack-nut, Fig. 1; $r' r'$, oil-discharge channel, Fig. 1; R, oil-discharge pipe, Fig. 1; D, filling-cap, Fig. 3; $d'$, filling-hole, Figs. 3 and 4; O, oil-indicator, Fig. 1; P, indicator-head, Fig. 1; Q, indicator-bolt, Fig. 1; J, discharge-vase, Figs. 1 and 3; C, discharge-valve, Figs. 1 and 3; $c'$, valve-sleeve, Fig. 1; $c^2$, valve-handle screw, Fig. 1; $c^3$, discharge-channel, Figs. 1 and 3.

Principle of operation: The lubricator being attached to a steam-pipe of an engine, as in Fig. 1, it is first cleaned of all foreign matter by opening valves A, B, and C, thus permitting the steam to blow through all the channels and the chambers in the device. The valves B and C are then closed. The valve A remaining open, the glass indicator K becomes filled with water by condensation. Valve A is then closed, filling-cap D removed, and the device filled with lubricant through filler-hole $d'$. Cap D is next replaced, and valve B opened, admitting water from condenser G, through channel $b'$ and water-discharge U, into oil in magazine H. The water, sinking in the oil in H, raises the latter, which flows over and into the oil-descent channel $n'$, Fig. 2, and continues through conductor N, discharging upward in drops at the nozzle of conductor N through the water in indicator K, then up into oil-ascent channel $n^2$, and by opening valve A the oil flows over and downward into oil-discharge channel $r' r'$, continuing through pipe R, and issuing into the steam in steam-pipe E in a foam. It is thence carried with the steam to the parts to be lubricated. The quantity of oil, which can be seen *en route* to the engine through the indicator K, can be regulated by the valves A or B, or both, the indicator O serving to indicate the near consumption of the oil to nearly the last drop in the oil-magazine.

The main constructive features of this lubricator—for instance, the trunk F, having separate steam and oil passages, the elevated condenser, and the tube T, in combination with the foregoing trunk, the suspended oil-magazine H, and the valve B, for regulating the flow of water to the oil-magazine from the condenser—have been patented to myself jointly with John J. Renchard, November 14, 1876, No. 184,426, and reissued September 20, 1881, No. 9,879, still form the successfully-operative base in this device, with modifications as to relativeness of channels and proper proportions and their embodiment more in accord with the lessons of experience and constructive skill. There are, in addition, several novel and useful features in this device which contribute to its successful operation and enable its production with lesser cost to the manufacturer and user. The connecting-trunk F forms the receptacle of nearly all details—valves, indicators, filling apparatus, channels, &c. It is a compendium upon which are secured the mechanisms of the whole device. It supports above its center the condenser, below its center the oil-magazine and discharge-valve, upon one side of its center the water-valve, on the opposite center the filling apparatus, upon its outer center the oil-valve A, below the latter the entire visible feed-indicator and attachments, and extending horizontally outward the oil-indicator O and its fastenings. By these direct and only fastenings the indicators are assured constant alignment, which is not disturbed by dismembering any of the parts, as is the case in other devices, which are usually provided with supports for the indicators attached to different bodies or parts, and therefore such parts cannot be disconnected without resulting in disturbing the alignment of the indicator-supports, and therefore so many indicators are fractured by the torsional strain brought upon them.

One especial novelty is the horizontal indicator-tube O at the front of the trunk and oil-receptacle. By this arrangement the smallest quantity of oil in the upper portion of the magazine is indicated, because the inner surface of said indicator is on a level with the ceiling of the magazine, and the operator may therefore run the device until nearly the last drop of oil is used. In other devices the upper indicator-holder obscures the extreme top of the remaining lubricant, and as he can only conjecture the quantity remaining he usually prefers to let it out and fill the device anew, thus wasting at each emptying a considerable amount of oil. In my device the indicator is very short, is easily applied, and costs but a trifle compared with other kinds.

Another feature is the pendent visible feed-indicator K, supported on its inner side by the oil-conductor N, vase L, and vase-bolt M, which forms a very neat arrangement, easily cleaned, detached, and applied. Located directly below the front center of the trunk F, and close to the indicator O, it is easily viewed, in combination with latter indicator, at one glance and from the same position. The ends of these indicator-tubes are submerged in annular grooves, lined with soft rubber, preventing danger of fracture and permitting unequal expansion. The annular grooves and submerged ends of the indicators also prevent the rubber packings from leaving their positions, in which they assume any degree of pliability. The conductor N, being heavy, readily contributes the needed caloric to the water in the indicator K, and also keeps the transient oil limpid.

Yet another feature is the arrangement of the oil-channel $r'\,r'$ in the trunk F and its relation to oil-valve A, by which it has a descent from the latter. The channel $n^2$ is also directly communicative to the valve A, and hence there is no space which can hold any considerable quantity of oil to become disintegrated from the steam or excessive caloric which may find its way there from the steam-pipe of engine through the discharge-channel $r'\,r'$. The valve A is also admirably isolated from the steam-pipe E. It thus remains quite free from oxides, which usually form about them when in too close proximity to the steam-pipe. The fall from the valve A into the main channel $r'\,r'$ is of great advantage, as it prevents any of the heated oil after discharge therein from receding to the valve and possibly to the passage $n^2$, and hence no stearic globules can readily descend the water in the indicator K. The oil-descent channel $n'$, (see Fig. 2 and indicated by dotted lines in Fig. 1,) and through which the oil passes, as indicated by arrows, is advantageous in that it extends to the top of the oil-receptacle and takes its supply therefrom until nearly every drop of oil in the magazine is consumed without admitting any of the accumulated water to the exclusion of any oil there may remain in the magazine.

Another useful feature is the horizontal filling-aperture $d'$ and the cap D. (See Fig 4 for $d'$.) The upper inside surface of the filling-aperture being on a level with the ceiling of the oil-magazine in the trunk F, the latter can be filled full, and thus exclude all the contained atmosphere, and no atmosphere is injected when the cap H is replaced, as it gradually closes over the aperture $d'$ without entering into it, as in other devices in which vertical and threaded stoppers are employed, and which are cored at their ends to make them light. In my device the beauty and symmetry are also left unimpaired by not using a vertical stopper.

The vase J, embracing the valve C, is deemed advantageous, as by its construction a considerable exhaust-chamber is secured, which admits of free egress to the waste accumulation in magazine H, and thus prevents the formation of sediment about the point or seat of the valve C. The sleeve $c'$ is also useful to admit of examination of the valve-seat, as the sleeve can be readily taken out.

Having thus described my invention, I claim and desire to secure by Letters Patent—

1. In lubricators, the combination, with the trunk F, having proper steam-inlet and oil-discharge channels, provided with suitable valves, of the indicators O and K, arranged to operate substantially as and for the purpose specified.

2. The combination, with the trunk F, condenser G, and magazine H, of the indicator K, conductor N, vase L, and vase-bolt M, arranged and adapted to operate substantially as specified.

3. In lubricators, and to show the highest level or the surface of the lubricant in the oil-magazine, the horizontal tubular indicator O, in combination with the magazine H and trunk F, arranged substantially as specified and shown.

4. In lubricators, the trunk F, provided with the oil-ascent channel $n^2$, valve A, and oil-discharge channel $r'$ $r'$, the latter having a fall or decline, and arranged to operate substantially as described.

5. In a lubricator, the discharge-channel $r'$ $r'$, valve A, oil-conductor N, oil-ascent channel $n^2$, and oil-descent channel $n'$, whereby the entire oil is enabled to descend without prevention from the accumulating water, substantially as specified.

6. In combination with the oil-magazine of a lubricator, and to prevent the injection of atmosphere on the surface of the lubricant, the horizontally-closing filling-cap D, whereby the orifice $d'$ is covered, substantially as described.

Signed this 14th day of December, 1882.

J. VINCENT RENCHARD.

Witnesses:
A. M. GRAHAM,
L. YATES.